United States Patent [19]

Otto, Jr. et al.

[11] 4,368,074
[45] Jan. 11, 1983

[54] METHOD OF PRODUCING A HIGH TEMPERATURE METAL POWDER COMPONENT

[75] Inventors: William L. Otto, Jr., Leechburg; Edward G. Flynn, Pittsburgh, both of Pa.

[73] Assignee: Aluminum Company of America, Pittsburgh, Pa.

[21] Appl. No.: 109,853

[22] Filed: Jan. 7, 1980

Related U.S. Application Data

[63] Continuation of Ser. No. 859,086, Dec. 9, 1977, abandoned.

[51] Int. Cl.³ .............................. B22F 3/00; B22F 3/14
[52] U.S. Cl. ........................................ 419/51; 419/48; 419/56; 106/38.27
[58] Field of Search ................. 29/420.5; 75/200, 226, 75/223, 208 R

[56] References Cited

U.S. PATENT DOCUMENTS

| | | | |
|---|---|---|---|
| 2,798,810 | 7/1957 | Goetzel | 75/201 |
| 3,284,195 | 11/1966 | Googin et al. | 75/223 |
| 3,286,498 | 11/1966 | Cogan | 72/61 |
| 3,356,496 | 5/1967 | Hailey | 75/226 |
| 3,455,682 | 7/1969 | Barbaras | 75/223 |
| 3,469,976 | 9/1969 | Iler | 75/223 |
| 3,719,479 | 3/1973 | Flanagan | 75/226 |
| 3,844,778 | 10/1974 | Malone et al. | 75/208 R |
| 3,940,268 | 2/1976 | Cotlin | 75/226 |
| 3,970,517 | 7/1976 | Van Nederreen | 75/226 |
| 3,992,200 | 11/1976 | Chandhok | 75/226 |
| 4,051,708 | 10/1977 | Beane et al. | 72/354 |
| 4,063,939 | 12/1977 | Weaver et al. | 75/226 |
| 4,088,502 | 5/1978 | La Bar | 106/64 |
| 4,094,709 | 6/1978 | Rozmus | 75/226 |

FOREIGN PATENT DOCUMENTS

| 2035045 | 1/1972 | Fed. Rep. of Germany | 75/226 |
|---|---|---|---|
| 45-31526 | 10/1970 | Japan | 75/226 |

OTHER PUBLICATIONS

Hausner H. H., Handbook of Powder Metallurgy, pp. 1, 17, Chem. Pub. Co., N.Y. 1973.

*Primary Examiner*—Brooks H. Hunt
*Attorney, Agent, or Firm*—Patrick J. Viccaro; Carl R. Lippert

[57] ABSTRACT

A method is provided for producing a fully dense high temperature powdered metal component. This process comprises the steps of filling a centrally located mold cavity with a high temperature powder, heating the filled mold to a temperature greater than half the melting temperature of the powder in degrees centigrade and less than the melting temperature of the powder, while the cavity is maintained in a vacuum level of at least twenty microns of mercury, axially compressing the heated mold while maintaining the vacuum at a pressure of at least 345 megapascals, while restricting the mold about its lateral periphery holding the mold in a compressed state for at least 20 seconds after attaining maximum pressure, and separating the mold materials from the component. The mold is composed of a material having substantially the same flow stress throughout, and the material is able to maintain its dimensional stability in a viscoelastic state at a temperature of between approximately 950° to 1300° C.

9 Claims, 8 Drawing Figures

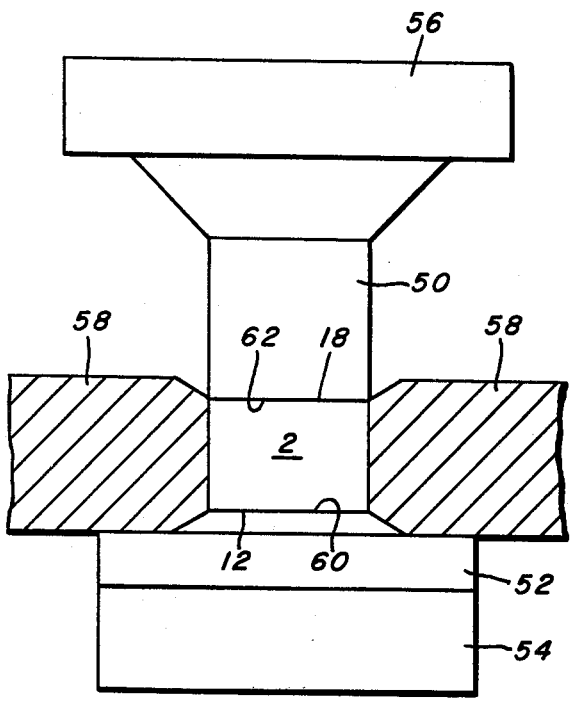
FIG. 6.
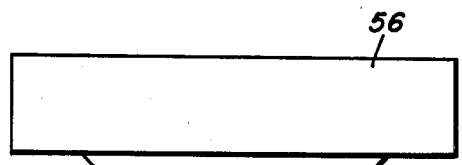
FIG. 7.
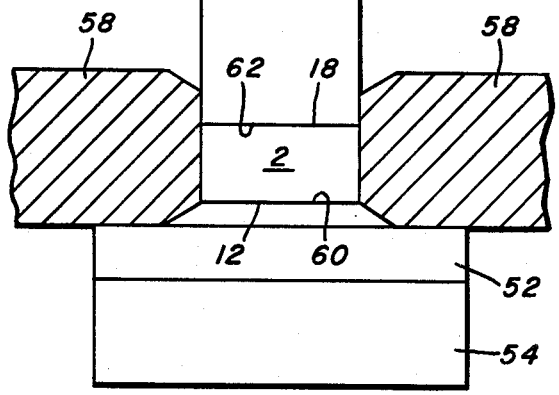
FIG. 8.
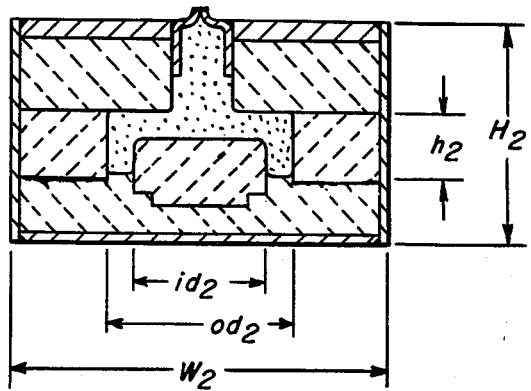

METHOD OF PRODUCING A HIGH TEMPERATURE METAL POWDER COMPONENT

This is a continuation of application Ser. No. 859,086, filed Dec. 9, 1977 now abandoned.

BACKGROUND OF THE INVENTION

This invention relates to a method of compacting high temperature metal powders and, more particularly, to a method of producing complex configuration parts from high temperature metal powders by compacting a heated mold containing the powder in the axial direction while restricting the mold in the lateral direction, such as can be accomplished between the dies of a conventional forging press in conjunction with a compaction cylinder.

High temperature metallurgy has advanced rapidly in recent years to meet ever increasing demands. The most significant advances in the area of high temperature alloys appear to be in the aircraft and aerospace industries. High temperature metals, such as titanium or superalloys of the nickel-base, cobalt-base or iron-base variety, are primarily used in such environments wherein operating temperatures range from about 1200° to 1800° F. and stresses are high. Powder metallurgy techniques are typically employed in producing components or structure from these alloys. Such components are particularly suited for critical jet engine applications, such as discs, shafts, turbine blades, nozzle vanes, seals, and other propulsion system uses in which high temperatures and stresses are encountered.

Current methods of compacting high temperature metal powders to complex shapes include hot isostatic compacting, such as that disclosed in Chandhok, U.S. Pat. No. 3,700,435 and Havel U.S. Pat. No. 3,622,313. Hot isostatic compacting typically involves transmitting pressure through a fluid medium to a deformable container holding the powder. The medium transmits a uniform pressure throughout the chamber holding the liquid or gaseous medium and the container. When an inert gas, such as argon, is used as the pressure medium in an isostatic press, large amounts of energy are required for heating and for compressing. In an isostatic press, the same unit pressure, of about 15 ksi, is applied against all areas of the deformable container for an excessive period of time, such as four to eight hours, resulting in a uniform density throughout the compacted article. Isostatic compacting in an autoclave is used primarily in the forming of complicated or intricately shaped, fully dense articles, which heretofore were not able to be successfully formed between the dies in a forging press. One of the unexpected advantages of the method of the present invention is that an equivalent high temperature metal powder component may be quickly formed by relatively high pressure uniaxial compression of a particular heated mold holding the powder in a centrally located cavity. It was previously thought that the strength of a low thickness to diameter ratio components formed by relatively high pressure compression at high temperatures was inferior to that of a component formed by hot isostatic pressing. Accordingly, an economical and effective method is desired for producing complex configuration parts from high temperature metal powder.

SUMMARY OF THE INVENTION

This invention may be summarized as providing a process for producing a fully dense, high temperature powdered metal component. This process comprises the steps of filling a centrally located mold cavity with a high temperature metal powder, heating the filled mold to a temperature greater than half the melting temperature of the powder in degrees centigrade and less than the melting temperature of the powder, while the cavity is maintained in a vacuum of at least twenty microns of mercury, axially compressing the heated mold while maintaining the vacuum at a pressure of at least 345 megapascals, while restricting the mold about its lateral periphery holding the mold in a compressed state for at least 20 seconds after attaining maximum pressure, and separating the mold materials from the component. The mold is composed of a material having substantially the same flow stress throughout, and the material is able to maintain its dimensional stability in a viscoelastic state at a temperature of between approximately 950° to 1300° C.

Among the advantages of the present invention is the provision of a method for producing a fully dense, high temperature metal powder component which requires a relatively short compaction time.

It follows that an objective of this invention is to provide a high temperature metal powder compacting method in which the component attains full part densification within the dies of a forging press in less than a few minutes, resulting in increased production rates.

Other advantages of the present invention include the elimination of cracking of the formed component, the reduction of the amount of machining required and the elimination of part distortion.

Another objective of this invention is to minimize and perhaps eliminate contamination of the compacted part previously caused by the mold material.

A further objective of the present invention is to provide a compacting method which requires less energy than previously required by significantly reducing the compacting time even though the compacting pressures are increased with relation to the conventional times and pressures used in an autoclave or hot isostatic press. Such overall energy savings are experienced even over batch processing in an autoclave.

These and other objectives and advantages will be more fully understood and appreciated with reference to the following detailed description and the drawings appended hereto.

BRIEF DESCRIPTION OF THE DRAWINGS

FIG. 6 is a partial cross-sectional view of a container as illustrated in FIGS. 1 to 5 positioned between the dies of a forging press prior to compaction.

FIG. 7 is a partial cross-sectional view of the container illustrated in FIG. 6 after compaction.

FIG. 8 is a cross-sectional view of the container illustrated in FIG. 1 after it has been compacted between the dies of a forging press.

DESCRIPTION OF THE PREFERRED EMBODIMENTS

Figure 1:
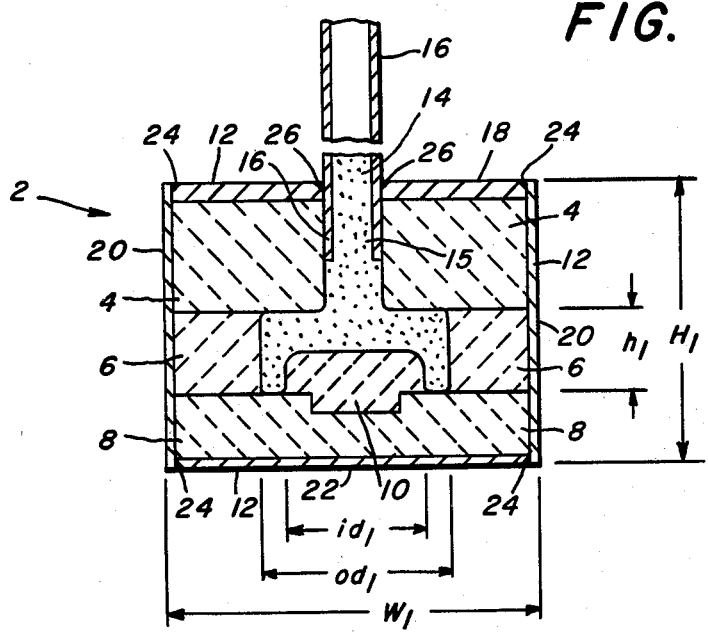
FIG. 1 is a cross-sectional view of a multipiece container or mold prior to compaction with its disc-shaped cavity filled with high temperature metal powder.

Referring particularly to the drawings, FIG. 1 illustrates a cross-section of a cylindrical mold 2 which is subsequently compressed in accordance with the present invention to produce a compacted, fully dense, high temperature metal powder part. The dimensions of the produced part correspond to the shape of the uncompacted, centrally located die cavity, as measured in the lateral direction, as indicated by $od_1$, $id_1$ and $w_1$. The mold 2 shown in FIG. 1 is typically ceramic and comprised of four separate core sections 4, 6, 8 and 10. The upper ring 4, the middle ring 6 and the lower plate 8 have the same outside diameter. The outside diameter of the disc-shaped insert 10 defines the inside diameter of the disc-shaped mold cavity. When the mold 2 shown in FIG. 1 is made of ceramic material, it must be surrounded by a metal shell 12 or can. The cavity is filled with high temperature metal powder 14 through a passageway 15 which extends from the centrally located cavity to the periphery of the mold 2. The cavity may be filled through a feed pipe 16 of the like, which extends through the upper wall 18 of the shell 12 and may extend into and tightly fit into a portion of the upper mold ring 4. The sidewalls 20 of the can 12 are preferably held tightly to the end walls 18 and 22 of the can 12 by an airtight weld 24 or the like. Likewise, the feed pipe is preferably welded along its outside diameter to the upper wall 18 of the can 12, as shown at 26. Although the use of a single passageway 15 and feed pipe 16 is preferred, multiple passageways and feed pipes may be employed.

Figure 2:
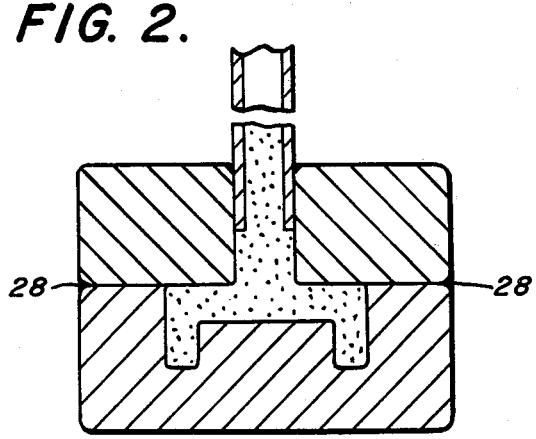
FIG. 2 is a cross sectional view of an alternative multipiece container prior to compaction according to the method of the present invention.
Figure 3:
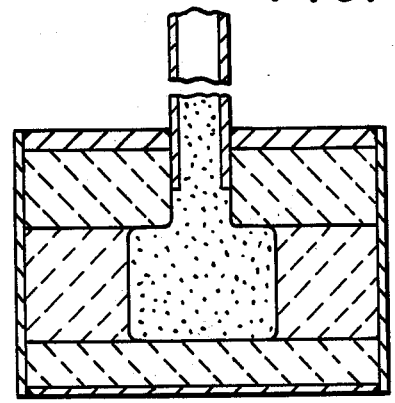
FIG. 3 is a cross-sectional view of an alternative multipiece container prior to compaction having a generally cylindrically shaped cavity filled with high temperature metal powder.
Figure 4:
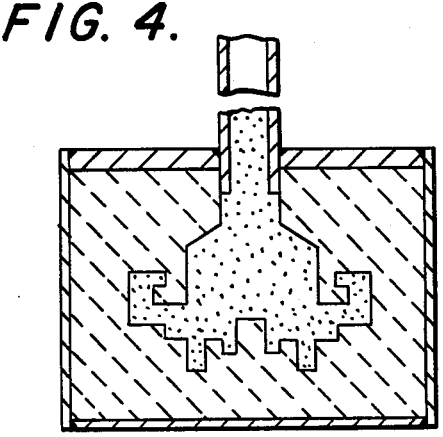
FIG. 4 is a cross-sectional view of another alternative multipiece container prior to compaction, having an intricate disc-shaped cavity filled with high temperature metal powder.
Figure 5:
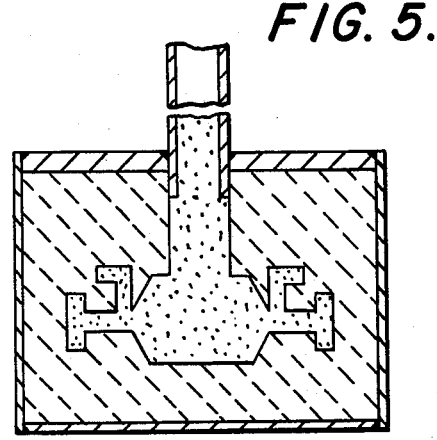
FIG. 5 is a cross-sectional view of another alternative multipiece container prior to compaction having a turbine blade shaped cavity filled with high temperature metal powder.

FIGS. 2 through 5 illustrate cross-sectional views of alternative multipiece containers or molds 2 prior to compacting. In the container 2 shown in FIG. 2, no shell is required. As explained below, a shell is necessary mainly to assure that the mold materials do not loose their rigidity when heated to the compacting temperature. The mold 2 shown in FIG. 2 may be constructed of low carbon steel or stainless steel which allows the mold pieces themselves to be welded together, as shown at 28. FIGS. 3, 4 and 5 illustrate alternative die cavity configurations. These configurations are merely illustrative, and the present invention is not to be limited to such configurations. The cavity shape shown in FIGS. 1 and 2 may be utilized to produce discs used in jet engines. The cavity configuration illustrated in FIG. 3 may be used to form a cylindrical billet for subsequent hot die forging. FIGS. 4 and 5 illustrate cavity configurations for the forming of complex jet engine discs. It will be understood by those skilled in the art that the number of pieces used to form the multipiece mold usually varies depending upon the intricacy of the part to be compacted. The number of mold pieces has no detrimental effect on the process of the present invention as long as the pieces fit tightly together, i.e. with the maximum clearance therebetween less than 0.005 inch, and preferably less than 0.001 inch. Such close tolerances are required to prevent flashings from forming during compaction which would require time and expense to remove and to eliminate distortion of the formed part.

The mold materials use to construct a container 2 to be compacted in accordance with the present invention preferably have the same flow stress throughout to assure unformity of densification and pressure transfer during compaction to eliminate any possibility of part distortion. Preferably the mold material also has a lower flow stress than that of the high temperature metal powder being compacted. Flow stress is the stress necessary to produce plastic deformation or flow of a solid material. The mold materials must also be rigid enough to maintain their dimensional stability in a viscoelastic state when heated to approximately 950° C. to 1300° C. The mold material is viscoelastic when it is viscous, yet simultaneously exhibits certain elastic properties, such as the ability to store energy of deformation and in which the application of stress gives rise to a strain that approaches equilibrium value slowly. The mold materials, therefore, act as a viscoelastic fluid able to transmit pressure therethrough when compacted at the above temperature as the mold is deformed, and the metal powder is compacted to full density between the dies of a forging press or the like. Finally, the mold materials must not cause significant contamination of the formed part.

Exemplary mold materials may be of two general classes: metals or ceramics. The metal mold materials particularly suited for the present invention include stainless steel and low carbon steel. Cast iron and pressed and sintered iron core materials have been found to be unacceptable because they result in significant contamination of the part formed in accordance with the present invention. Since stainless steel is relatively expensive, since it is difficult to remove metal molds from the formed superalloy parts, and since metal molds result in some, although minimal, contamination, ceramic mold materials are preferred. Suitable ceramic mold materials are hydraulic setting polycrystalline castable refractory with composition additions that impart the desired viscoelastic properties for dimensional control during compaction. Such castable refractory mixture is set forth in U.S. application Ser. No. 759,984, filed June 17, 1977. The preferred mold material consists of approximately 60–70 parts by weight fused silica aggregate with 20–35 parts by weight calcium aluminate cement binder, and 3–15 parts by weight low melting borate glass frit. By altering the frit content, mold materials can be tailored to obtain the bulk viscosity necessary for certain high temperature metal powders at given compacting temperatures. For example, by increasing the frit content, the viscosity of the mold material decreases at a given temperature.

The high temperature metallic powder parts formed in accordance with the present invention typically may be small parts having a low thickness to diameter ratio. For example, a typical disc cavity, as illustrated in FIG. 1, would have the following dimensions prior to compaction: an outside diameter ($od_1$) of about 10.16 centimeters (4.00 inches), an inside diameter ($id_1$) of about 14.00 centimeters (3.50 inches), and a height ($h_1$) of about 4.29 centimeters (1.69 inches). As will be explained in more detail below, the mold will be compressed and compacted in the axial direction, as illustrated by the vertical arrow $H_1$ in FIG. 1, in practicing the method of the present invention. No compaction of the mold will occur in the lateral direction as illustrated by the horizontal arrow $W_1$, in FIG. 1. Therefore, allowance must be made for part compaction. To this end, the lateral dimensions $od_1$ and $id_1$ of the mold cavity should correspond to the desired lateral dimensions of the formed part. However, the axial or vertical dimensions of the mold cavity $h_1$ should be uniformly larger than the desired vertical dimensions of the formed part. To construct cavity dimensions that are uniformly larger than the formed part, it is meant that if a 17% compression is expected, the height $h_1$ of the mold cavity, measured through any vertical cross section of the cavity, should be 17% larger than the height $h_2$ of the formed part measured through a corresponding vertical cross section of the formed part.

A typical mold within which such a disc cavity is centered would have an overall height ($H_1$) of about 15.97 centimeters (6.29 inches), and a width ($W_1$) of about 14.43 centimeters (5.68 inches). The metal shell 12 around the mold is preferably about 0.23 centimeters (0.09 inches) except at the upper wall 18 which has a thickness of about 0.95 centimeters (0.375 inches). The metal shell 12 is preferably comprised of stainless steel or low carbon steel. The feed pipe 16 is preferably stainless steel or low carbon steel pipe having an outside diameter of 1.37 centimeters (0.54 inches) and an inside diameter of 0.92 centimeters (0.364 inches) The pipe 16 may extend outwardly of the mold 2 for a considerable length, such as about one and one-half meters (five feet). Such length of pipe 16 allows a vacuum to be easily applied to the cavity filled with high temperature metal powder 14 while the mold 2 is being heated prior to compaction. It will be understood by those skilled in the art that the present invention will be equally applicable to forming much larger parts. When larger parts are formed in accordance with this invention, there is no need to increase the thickness of the metal shell 12 or the feed pipe 16 proportionally, except to provide structural rigidity during handling of the heated assembly. In a preferred embodiment, the thickness of mold material between the cavity of metal powder and the sidewall of the container is approximately one-half the outside diameter (od) of the part being formed, and the mold material thickness between the cavity of metal powder and the upper and lower walls of the container is approximately equal to the uncompressed cavity height ($h_1$).

In practicing the method of the present invention, it is first necessary to construct or fabricate the mold. Individual sections of a ceramic multi-piece mold are usually poured into suitable dies while molten, then removed upon cooling. These individual sections are cast to very close tolerances, ±0.005 inch and more preferably ±0.001 inch. Metal mold sections usually have to be machined to the cavity design. The sections are then assembled. If the mold materials are ceramic, as indicated in FIG. 1, the sections are assembled inside a shell 12. If the sections are metal, as indicated in FIG. 2, the sections themselves are welded together. To construct the multipiece ceramic mold 2 shown in FIG. 1, the bottom wall of the shell 12 is welded to the cylindrical sidewall, and the lower disc 8 is inserted into the shell 12 with the recess facing upwardly. The disc-shaped insert 10 is then placed into the shell such that the downwardly facing projection thereon fits tightly into the upwardly facing recess in the lower disc 8. Then, the middle ring 6 is placed into the shell 12 on top of the lower disc 8, and the upper ring 4 is placed on the middle ring 6. The upper wall 18 of the shell 12 is placed upon and welded onto the top portion of the container. The feed pipe 16 is then inserted into a centrally located hole in the upper wall 18, and the pipe 16 is welded along its outside diameter to the upper wall 18 at the outside surface of the container. All of these welds 24 and 26 must be air tight and must not decompose at operating temperatures in order to maintain a vacuum seal within the mold 2 during preheating.

The mold cavity is filled by feeding the high temperature metal powder through a feed pipe 16 or the like. To increase the densification of the metal powder 14 in the mold cavity, the entire mold 2 is preferably agitated with a vibratory action during filling.

It has been found that the mold cavity should preferably be filled with metal powder such that the loose density of the powder is at least 50%, and more preferably 60%, dense. Sixty percent loose density may be readily obtained with conventional vibratory filling equipment. Since the part formed in accordance with the present invention must be fully dense, a certain degree of part compression will be experienced during compaction. The amount of compression will equal the reciprocal of the loose density. For example, the amount of compression experienced in instances in which the metal powder is packed at a loose density of 60% will equal the reciprocal of 60% or 1/0.6 or 16.6. As will be explained in more detail below, the container 2 is restricted about its lateral periphery, as shown by wall 20 in FIG. 1, during compaction. Such lateral restriction assures that the part is compressed only in the direction of axial compression such that the height of the formed part $h_2$ will be less than the original cavity height $h_1$, but the lateral dimensions $od_1$ and $od_2$, as well as $id_1$ and $id_2$ will not be altered as a result of the method of the present invention.

High temperature metal powders that may be used to form components in accordance with the present invention include nickel-base, cobalt-base and iron-base superalloy powders and titanium alloy powders. Some examples include:

IN-100, a trade name of International Nickel Co., Inc.
René 95, a trade name of General Electric Co.
Ti-6246—standard titanium alloy designation
Ti-64—standard titanium alloy designation After the mold cavity has been filled with the particular metal powder, the mold should be sealed under vacuum tight conditions. To accomplish this a hose from a conventional vacuum pump may be coupled to the free end of the feed pipe 16. Then the mold is heated. The compact should be evacuated until it has been heated to the desired temperature of from approximately 950° to 1300° C. The actual heating temperature should be greater than half the melting temperature of the particular metal powder in degrees centigrade and less than the melting temperature of the specific high temperature metal powder. It is important that substantially none of the metal powder melt during preheating of the mold.

Upon reaching the required vacuum level of at least twenty microns of mercury and preferably approximately ten microns of mercury and the required temperature, the mold is closed under vacuum tight conditions. This may be done by crimping or pinching the feed pipe 16 close to the upper surface of the mold 2. Then the pipe 16 is welded about the crimp to insure a vacuum tight seal.

The closed mold 2 should be placed between the dies 50 and 52 of a forging press, such as that shown in FIG. 6, before experiencing significant heat loss. A significant heat loss would be such that the temperature of the powder was cooled to less than half the melting temperature of the powder in degrees centigrade. Preferably, the mold is compressed before it has cooled more than 200° C. from the maximum heating temperature. To minimize heat loss, the dies of the forging press should also be heated to the highest possible temperature as established by the die and tooling materials. A die temperature of about 480° C. (900° F.) is not uncommon for tools used in the present invention. As shown in FIG. 6, an exemplary forging press would include a lower die 52 mounted on a lower platen 54 and an upper die 50 mounted on an upper platen 56. The cylindrical mold 2 is placed inside a forge ring 58. In this embodiment the forge ring 58 comprises a compaction cylinder which restricts the mold placed therein about its lateral periphery to prevent lateral displacement during compression of the mold. The bottom surface 12 of the mold 2 should rest on the upper forging surface 60 of the lower die. In this embodiment the upper die 50 is lowered, as shown in FIG. 6, such that the lower forging surface 62 of the upper die 50 contacts the upper wall 18 of the mold 2. It will be understood that either die or both dies could be displaced toward one another in the method of the present invention. An elevated temperature graphite lubricant is preferably used on the working surfaces of the dies and on the inside surfaces of the compression cylinder 58 during the forging cycle.

The upper die 50 continues its downward progression to axially press the mold 2 between the dies, as shown in FIG. 7, until the mold 2 attains full density. During compaction in an enclosed die, the high temperature metal powder is constrained by the mold as the mold and the metal powder are compressed in the axial direction, that is, the direction of compaction. The viscoelastic mold is constrained in the lateral direction by the inside walls of the compression cylinder and, under pressure, assumes and maintains a hydrostatic stress state. In such hydrostatic condition, the mold transmits pressure from the uniaxially compressed dies to the powder, not only in the axial direction but also in the radial and circumferential directions. After maximum pressure of at least 345 megapascals (50 ksi), and preferably 772 megapascals (112 ksi), is attained, the mold 2 is held within the compressed dies for a dwell time of approximately 20 seconds to five minutes until the part is fully densified. It will be understood that part densification occurs for a period after maximum pressure is reached. The dwell time varies for each type of powder and is easily determined by testing whether the part has attained full densification. Increasing the dwell time above that required to attain full densification has a very minimal effect, if any, on the tensile properties of the formed part.

After the desired dwell time has elapsed, the dies 50 and 52 are opened and the compacted mold is removed. A cross-sectional view of a part formed by the present invention is shown in FIG. 8. Notice that the configuration of the mold, the mold cavity and resultant superalloy part is compressed approximately 17% in the axial direction. The mold cavity dimensions in the lateral direction, $od_2$, $id_2$ and $W_2$, substantially retain their original values, $od_1$, $id_1$ and $W_1$, throughout the pressing operation. During compaction under the heated conditions described above, the mold material acts as a viscoelastic fluid transmitting pressure to the heated powder in the mold cavity. During compaction with the lateral periphery of the mold restrained by the compaction cylinder 58, the uniaxial pressure is at least partially converted to hydrostatic pressure first within the mold then within the part itself to form the fully dense part. It will be understood, therefore, that the mold materials preferably have lower flow stress than the powders being compacted.

The container 2 may be cooled prior to removing the mold from the formed part. Cooling may be natural, which normally requires about 36 hours to reach room temperature, or forced air cooled, which requires about four hours to reach room temperature. If the mold is metallic, it will have to be machined from the formed superalloy part in which case, the container should be cooled. If the mold 2 is ceramic with a metal shell 12, the container may be cooled to facilitate cutting through the shell 12 and chipping the ceramic material from the formed part. However, a ceramic mold 2 with a steel shell 12 may be removed while hot by burning through the shell 12 with a torch, or the like, and then chipping the ceramic material from the formed superalloy part. It has been found, however, that while hot, the ceramic material tends to stress relieve itself and separate from the part. This may cause the chips to project dangerously through the work area.

The high temperature metallic part formed in accordance with the present invention is fully dense, and exhibits the strength characteristics which make the parts suitable for critical jet engine components such as discs, shafts and seals, and the like.

EXAMPLES

The following table illustrates typical process conditions and operating variables encountered in producing discs approximately ten centimeters (four inches) in diameter, such as those illustrated in FIG. 1 (Examples 4 and 5) and FIG. 2 (Examples 1, 2, 3 and 6) in accordance with the present invention:

TABLE 1

| Example | Alloy | Dwell Time | Compacting Temperature | Mold Material | Compacting Pressure |
|---|---|---|---|---|---|
| 1 | René-95 | 5 min. | 1260° C. | Steel-low carbon | 772 MPa (112 ksi) |
| 2 | In-100 | 20 sec. | 1121° C. | Steel-low carbon | 772 MPa (112 ksi) |
| 3 | Ti-64 | 60 sec. | 1038° C. | Steel-low carbon | 772 MPa (112 ksi) |
| 4 | Ti-64 | 60 sec. | 1038° C. | Ceramic-6% frit | 772 MPa (112 ksi) |
| 5 | Ti-64 | 60 sec. | 1038° C. | Ceramic-15% frit | 345 MPa (50 ksi) |
| 6 | Ti-64 | 60 sec. | 982° C. | Steel-low carbon | 772 MPa (112 ksi) |

The following table illustrates the strength characteristics of the discs formed in Table 1 at room temperature after various methods of heat treatment:

TABLE 2

| Example | Tensile Strength | Yield Strength | Elongation | Reduction of Area | Heat Treatment |
|---|---|---|---|---|---|
| 1 | 1516 MPa | 1116 MPa | 16% | 17% | Solution treated and aged |

TABLE 2-continued

| Example | Tensile Strength | Yield Strength | Elongation | Reduction of Area | Heat Treatment |
|---|---|---|---|---|---|
| 2 | 1572 MPa | 1103 MPa | 23% | 22% | Solution treated and aged |
| 3 | 1151 MPa | 1027 MPa | 14% | 26% | Solution treated and aged |
| 3 | 1061 MPa | 965 MPa | 16% | 26% | Solution treated and anneal |
| 4 | 1110 MPa | 1020 MPa | 12% | 27% | Solution treated and anneal |
| 5 | 931 MPa | 800 MPa | 16% | — | As pressed |
| 5 | 931 MPa | 813 MPa | 15% | — | Anneal |
| 6 | 1186 MPa | 1103 MPa | 4% | 6% | Solution treated and aged |

Whereas, the particular embodiments of this invention have been described above for illustration, it will be apparent to those skilled in the art that numerous variations of the details may be made without departing from the invention.

What is claimed is:

1. A method of producing a fully dense high temperature metallic component from high temperature metal powder comprising:
    filling a centrally located mold cavity with a high temperature metal powder, said cavity having a shape substantially conforming to the dimensional configuration of the component to be formed as measured in the lateral direction, said cavity having a shape uniformly larger than the dimensional configuration of the component to be formed as measured in the vertical direction, said mold composed of a material having substantially the same flow stress throughout, said material able to maintain dimensional stability in a viscoelastic state at a temperature of from approximately 950° to 1300° C., said mold having at least one passageway therethrough leading to said cavity,
    heating the filled mold to a temperature greater than half the melting temperature of the powder in degrees centigrade and less than the melting temperature of the powder, while applying a vacuum to the cavity of at least twenty microns of mercury,
    closing the mold to provide a vacuum tight seal,
    axially compressing the sealed mold while maintaining the mold within the above heated temperature range, said axial compression being in the vertical direction with respect to the cavity dimensions at a pressure of at least 345 megapascals to effect plastic flow of the metal and mold, while restricting the mold about its lateral periphery with respect to the cavity dimensions,
    holding said mold in a compressed state for less than five minutes including at least 20 seconds after attaining maximum pressure, and
    separating the mold materials from the component.

2. A method as set forth in claim 1 wherein said mold is axially compressed between heated dies of a forging press while the lateral periphery of the mold is restricted by a compaction cylinder.

3. A method as set forth in claim 1 wherein said mold is low carbon steel.

4. A method as set forth in claim 1 wherein said mold is stainless steel.

5. A method as set forth in claim 1 wherein said high temperature metal powder is selected from the group consisting of nickel-base superalloy powders, cobalt-base superalloy powders, iron-base superalloy powders, titanium alloy powders and aluminum alloy powders.

6. A method as set forth in claim 1 wherein said mold consists of
    20-35 parts by weight calcium aluminate,
    60-70 parts by weight fused silica, and
    3-15 parts by weight zinc borosilicate frit.

7. A method as set forth in claim 6 wherein said mold is provided with a steel shell therearound.

8. A method as set forth in claim 7 wherein said shell has a thickness of at least 0.20 centimeters.

9. A method of producing a fully dense titanium alloy component having a low thickness to diameter ratio comprising the steps of:
    filling a centrally located mold cavity with a titanium alloy powder having a flow stress greater than that of the mold material, said mold being ceramic with a steel shell therearound, said shell having a thickness of at least 0.20 centimeters, with a centrally located die cavity therein, said cavity having a shape substantially conforming to the dimensional configuration of the dimensional configuration of the titanium alloy component to be formed, as measured in the lateral direction, said cavity having a shape uniformly larger than the dimensional configuration of the titanium alloy component to be formed as measured in the vertical direction, said ceramic mold composed of 20-35 parts by weight calcium aluminate, 60-70 parts by weight fused silica, and 3-15 parts by weight zinc borosilicate frit having substantially the same flow stress throughout, said mold material able to maintain dimensional stability in a viscoelastic state at a temperature of approximately 950° to 1300° C., said mold having at least one passageway therethrough leading to said cavity,
    heating the filled mold to a temperature greater than half the melting temperature of the titanium alloy powder in degrees centigrade and less than the melting temperature of the titanium alloy powder, while applying a vacuum to the cavity of at least approximately 20 microns of mercury,
    closing the mold to provide a vacuum tight seal,
    axially compressing the sealed mold while maintaining the mold within the above heating range, said axial compression being in the vertical direction with respect to the cavity dimensions at a pressure of at least 345 megapascals to effect plastic flow of the metal and mold while restricting the mold about its lateral periphery with respect to cavity dimensions,
    holding the mold in a compressed state for less than five minutes including at least 20 seconds after attaining maximum pressure, and
    separating the mold material from the titanium component.

* * * * *